Oct. 29, 1968   C. F. SHELTON, JR   3,408,453
POLYIMIDE COVERED CONDUCTOR
Filed April 4, 1967
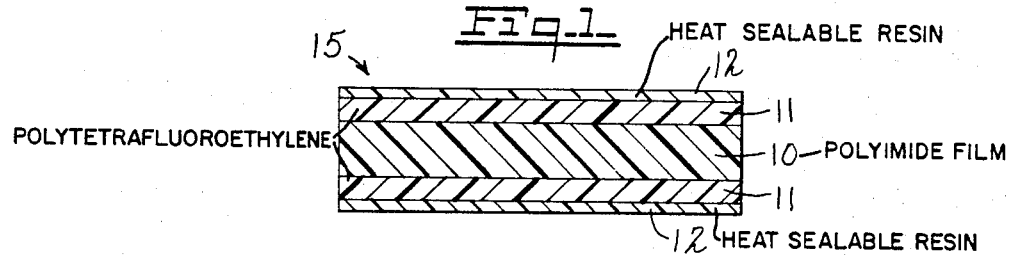
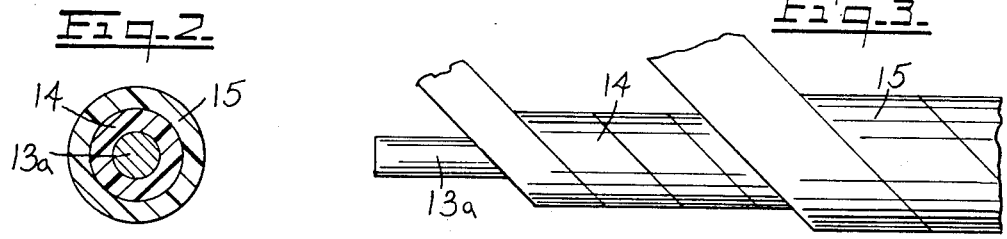
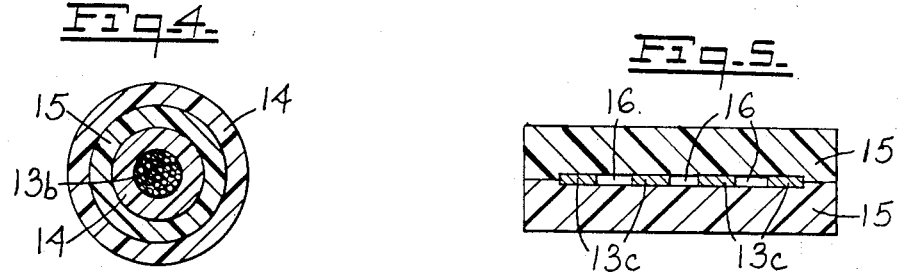
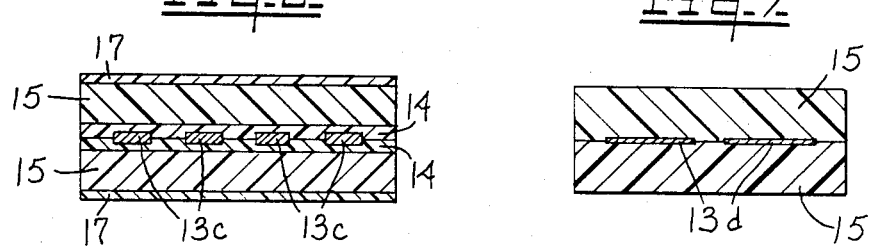
INVENTOR
Charles F. Shelton, Jr.
BY De Lio and Montgomery
ATTORNEYS United States Patent Office 3,408,453
Patented Oct. 29, 1968

3,408,453
POLYIMIDE COVERED CONDUCTOR
Charles F. Shelton, Jr., Branford, Conn., assignor to Cerro Corporation, New York, N.Y.
Filed Apr. 4, 1967, Ser. No. 628,387
17 Claims. (Cl. 174—68.5)

ABSTRACT OF THE DISCLOSURE

An electrically insulated conductor for conducting electricity at high temperatures without breakdown comprising a metallic conductor covered by laminated layers of polyimide resin and polytetrafluoroethylene sealed together by means of heat-sealable B-state polytetrafluoroethylene, or a melt-processable resin such as fluorinated ethylene propylene resin or polychlorotrifluoroethylene in such a manner that the polyimide resin is always protected by a layer of polytetrafluoroethylene.

---

This invention relates to insulated electrical conductors and more particularly to insulated conductors which are capable of withstanding temperatures in the neighborhood of 500° F. or above in the presence of air and moisture.

Since the introduction of polyimide resin tapes, which are characterized by superior electrical, physical, and mechanical properties, especially in thin-walled insulation systems, a demand was generated to exploit their useful properties while minimizing their deficiencies.

Polyimide resins have been described in the literature as polypyromellitimides produced by the condensation of pyromellitic dianhydride with a diamine, such as meta-phenylenediamine, 4,4'-diaminodiphenyl ether, and benzidine (see J. A. Brydson, "Plastic Materials," Van Nostrand, 1966, pages 313–14). For the purposes of this application, these resins will be referred to simply as polyimide resins.

Deficiencies of polyimide tapes when employed in electrical insulation are as follows:

(1) They do not melt and cannot be heat-sealed to themselves.
(2) They are available only in their natural amber color.
(3) They tend to absorb water and are susceptible to oxidation, processes which causes deterioration of their useful properties.
(4) They are subject to shrinkage on subjection to the heating and cooling cycle resulting in warping and cracking of the insulation and exposure of the conductor.

As an outgrowth of the demand to minimize the above deficiencies, a polyimide tape coated with a fluorinated ethylene propylene resin (tetrafluoroethylene-hexafluoropropylene copolymer), known commercially as "Teflon" FEP-fluorocarbon resin, was developed. A tape of this type is available under the name, "Kapton" Type F film. The "Teflon" FEP resin coating acts as an adhesive by which the film can be heat-sealed to itself and provides some oxidation-resistance. However, this coated film is restricted in its utility by the fact that the FEP resin layer transmits moisture to the polyimide and restricts temperature limitations to approximately those of the FEP resin itself, viz. approximately 400° F. Also the coated tape is only available in its natural amber color. Colors for identifying insulated wire, cables, etc. when using the FEP resin coated tape can be obtained only by applying a colored layer over the said tape by dip-coating, color-taping, extrusion-coating, etc. using compatible insulating materials and pigments.

It is the object of this invention to provide an insulated conductor having new and improved temperature resistant properties.

Another object of this invention is to provide a new and improved insulated conductor comprising color-coated, heat-sealable, polytetrafluoroethylene-polyimide tape compositions, either singly or in combination with other materials to eliminate the need for additional coverings to provide color for identification purposes.

Other objects and advantages of the invention will, in part, be obvious and will, in part, be apparent from the specification.

The invention accordingly comprises an article of manufacture possessing the features, properties and relation of elements which will be exemplified in the article hereinafter described and the scope of the invention will be indicated in the claims.

For a fuller understanding of the nature and objects of the invention reference is made to the following description taken in conjunction with the accompanying drawing, in which the same reference numerals designate like or corresponding parts in the several views, and in which:

FIG. 1 is a greatly enlarged cross-sectional view of a laminated polytetrafluoroethylene-polyimide, heat-sealable insulating tape;

FIG. 2 is an enlarged cross-sectional view of an insulated wire conductor according to the invention;

FIG. 3 is a front elevational view of the insulated conductor of FIG. 2 with successive layers cut away to show the structure;

FIG. 4 is an enlarged cross-sectional view of an insulated stranded cable conductor showing an alternate of the invention;

FIG. 5 is an enlarged cross-sectional view of an insulated flat, flexible cable in which the conductors consist of a plurality of flat metal filaments;

FIG. 6 is an alternate of the flat insulated cable shown in FIG. 5; and

FIG. 7 is an enlarged cross-sectional view of an insulated conductive foil circuitry device according to the invention.

Referring to FIGS. 1 and 2, 10 represents a layer of heat-stabilized, preshrunk polyimide film. This is essential since unstabilized film will lead to distortion and breakage of the insulation on exposure to heating and cooling. Item 11 represents a layer of cast polytetrafluoroethylene (PTFE), and 12 is a heat-sealable resin layer preferably a B-state PTFE or a melt-processable fluorocarbon polymer. The B-stage PTFE is to be preferred because this fluorocarbon will withstand temperatures in excess of 500° F. (e.g. 540–698° F.). Melt-processable fluorinated hydrocarbons that can be employed are polychlorotrifluoroethylene (known commercially as "Kel-F" and "Halon") which will stand exposures up to 500° F. and FEP-fluorocarbon resin which can be subected to continuous use at about 400°. Less satisfactory alternates are polyvinylidene fluoride (known commercially as "Kynar") and polyvinyl fluoride (known commercilaly as "Tedlar") which tend to be unstable at temperatures of 300° F. However, small layers of these resins can be used at temperatures somewhat above the temperatures at which they are stable when used alone due to the protective action of the PTFE. It is understood that all the resin layers in FIGS. 1–7 may have a range of thickness depending on the composition of 12 and the insulation characteristics desired of the composite. Also 11 and 12 may be pigmented or nonpigmented.

Although as stated the various layers in FIG. 1 may have a range of thickness according to specific requirements, the following thicknesses have been found suitable:

Layer 10—approximately 1–7 mils.
Layer 11—approximately ¼ mil.
Layer 12—approximately ⅛ mil.

The PTFE layer 11 serves to protect the polyimide 10 from the action of moisture, heat and oxidation. The heat-sealable layer 12 makes it possible to seal the highly heat- and oxidation-resistant tape structure to itself or other substrates. For this purpose, its thickness should be as low as possible for effective sealing action.

Referring to FIGS. 2–7 which show insulated conductors in the various alternative forms of the invention, the metallic conductor 13 may take various forms: as 13a in which it is a metal wire, 13b in which it is a stranded cable, 13c in which it is a filament having a rectangular cross-section, and 13d in which it is a strip of metallic foil. The conductor is preferably copper or nickel-plated copper but may also be composed of such conductive materials as: e.g. silver, silver-plated copper, nickel, nickel-clad copper, or other copper alloys including high strength copper alloys.

Referring now to FIG. 2, directly around the metallic conductor, which may be wire 13a as shown or the stranded cable 13b of FIG. 4, is wrapped layer 14 consisting of PTFE tape which is heat-sealable on one side. This is done in such a manner that the insulating layer does not seal to the conductor and can be readily stripped therefrom. Layer 15 is the heat- and oxidation-resistant laminate whose structure is shown in FIG. 1.

Referring now to FIG. 4, a layer of the heat-sealable PTFE tape 14, heat-sealable on the outer side which does not come in contact with conductor 13b, is wrapped directly around the metallic conductor. On this layer is wrapped a surmounting layer 15 of the structure of FIG. 1. Over this is then wrapped a second layer of heat-sealable PTFE 14 so that the heat-sealable side is the inner side which contacts layer 15.

Referring to FIGS. 2–4, it should be noted that the layers are heat-sealed together by short term application of heat at a temperature in the range of 600–900° F. as required to complete the seal. This provides the needed mechanical, physical, and electrical requirements for environmental protection. Since the layer 15 as shown in FIG. 1 may be pigmented to any desired color, there is no need for additional layers or coatings to provide color identification. However, it is recognized that additional clear coverings, (such as a fluorocarbon dispersion coating applied by a dip-coating process, or extruded materials such as "Teflon" fluorocarbon resin, nylon, polysulfone, etc.; tape-wrapped materials such as polytetrafluoroethylene, polyesters, polycarbonates, etc.; or other clear coating applied in a conventional manner) may be applied over the outer layer in FIGS. 2–4 to improve the surface or scuff resistance. Also it should be noted that, if desired, the insulated conductor of these figures can be covered with an outer layer of glass braid coated with a heat-resistant finish such as a "Teflon" fluorinated resin finish. Additionally, as described by the prior art, other materials such as nylon, polyesters, quartz, etc. may be substituted therefor with compatible finishes.

Referring again to FIG. 4, layers 14, 15 and 14 are sealed together so that 15 is sandwiched between layers 14 for optimum resistance of 15 to oxidation. An outer layer, such as the glass braid layer as previously discussed, may be used to provide some additional physical and electrical protection required to meet environmental conditions.

While it is understood that the conductor dimensions may vary according to the design for any particular applications, the following charts of FIGS. 2 and 4 show suitable dimensions for a wire or cable insulated conductor constructed in accordance with the teachings of this invention.

FIG. 2

Conductor 13a—approximately 39 mil. outside diameter nickel-plated copper.
Layer 14—2 mil. wall of heat-sealable pigmented polytetrafluoroethylene tape.
Layer 15—4 mil. wall of FIG. 1 construction.

FIG. 4

Conductor 13b—approximately 39 mil. outside diameter stranded nickel-plated copper cable.
Layers 14—2 mil. wall of heat-sealable, pigmented PTFE.
Layer 15—8 mil. wall of FIG. 1 construction.

Referring to the flat flexible cable whose enlarged cross-section is illustrated in FIG. 5, conductor 13c consists of small metal filaments or strips having a rectangular cross-section. These conductors may have various dimensions as required by suitable dimensions range from widths and breadths falling in the range 2 x 25 mils. to 5 x 100 mils. These are covered on each side by layers 15 of the heat- and oxidation-resistant laminate of FIG. 1. However, in order to obtain a satisfactory seal, the spaces between the parallel filaments 16 may be filled with a small amount of a melt-processable fluorinated hydrocarbon polymer, such as "Teflon" FEP fluorocarbon. The minimal quantity is essential since an excess of the melt-processable resin would allow the conductor filaments to move or swim horizontally from side to side.

FIG. 6 shows another alternate of the flat flexible cable of FIG. 5 wherein, the conductors 13c are embedded between two layers of heat-sealable polytetrafluoroethylene 14. This structure may be obtained by sandwiching the conductors between the heat-sealing layers of B-stage PTFE. A conductive shielding consisting of a conductive metal foil 17 may be placed on the outside of the flat flexible insulated cable.

FIG. 7 is an enlarged cross section of a portion of an insulated circuitry device in which the conductor or conductors 13d consist of conductive metal foil strips sandwiched between the heat- and oxidation-resistant structure of FIG. 1, and commonly referred to as flexible printed wiring.

Referring to FIGS. 5–7 it should be noted that as in the case of the insulated conductors of FIGS. 2 and 3, the layers are sealed together by application of heat at a temperature in the range 600–900° F. as required to complete the seal. In these flattened structures, it is also desirable to apply both heat and pressure so that the conductors may be thoroughly embedded in the heat-processable fluorinated hydrocarbon or the B-stage polytetrafluoroethylene film as the case may be. Addition of various prior art outer coatings to these structures may also be made as discussed in connection with the insulated conductors of FIGS. 2 and 4. In particular it should be noted that the flat insulated conductor of FIGS. 5–7 may profitably be coated with a PTFE film with one heat-sealable surface either of B-stage PTFE or a melt-processable fluorinated resin such as fluorinated ethylene propylene resin or polychlorotrifluoroethylene. This film is applied and heat-sealed to the flat insulated conductors so that the heat-sealable surface contacts the flat layers of insulated material and is sealed thereto.

Illustrative of the temperature stability of the insulated conductors of this invention is their rating when subjected to scrape abrasion testing at 540° F. In general, performance to breakdown in a standard abrasion test was approximately ten times better than comparable prior art cables.

As will be seen, the teachings of this invention make it possible to construct a variety of insulated conductor forms which can be operated at temperatures in excess of 400–500° F. without breakdown. Also the light-weight fluorocarbon-polyimide coating structures of this invention may be provided in pigmented form without the need of additional coverings to provide color identification. It should be noted in this connection that the insulated structures of FIG. 1 may also be prepared so that only one surface is coated with heat-sealable fluorinated resin.

It will thus be seen that the objects set forth above, among those made apparent from the preceding description are efficiently attained and since certain changes may be made in the above without departing from the spirit and scope of the invention, it is intended that all matter attained in the foregoing description or shown in the accompanying drawings, shall be interpreted as illustrative and not in a limiting sense.

It is also to be understood that the following claims are intended to cover all generic and special features of the invention which, as a matter of language, might be said to fall between.

What is claimed is:

1. An electrically insulated conductor for conducting electricity at high temperatures without breakdown comprising, a metallic conductor covered by a layer of polytetrafluoroethylene film, one surface of which is covered by a heat-sealable fluorinated resin layer, in such a manner that said heat-sealable layer does not contact the conductor and is externally sealed to a heat- and oxidation-resistant, preshrunk polyimide film coated on both sides by a first layer of polytetrafluoroethylene and a second layer of heat-sealable fluorinated resin.

2. The electrically insulated conductor of claim 1 to which is applied an additional layer of polytetrafluoroethylene film, one surface of which is covered by a heat-sealable fluorinated resin layer, in such a manner that said heat-sealable resin layer contacts said insulated conductor and is sealed thereto.

3. An electrically insulated conductor for conducting electricity at high temperature without breakdown comprising, a metallic conductor covered by a layer of cast polytetrafluoroethylene film, one surface of which is covered by a heat-sealable fluorinated resin layer, in such a manner that said heat-sealable layer does not contact the conductor and is externally sealed to a heat- and oxidation-resistant, preshrunk polyimide film coated on both sides by a first layer of cast polytetrafluoroethylene and a second layer of heat sealable-fluorinated resin, each of said heat-sealable fluorinated resin layers consisting of B-stage polytetrafluoroethylene.

4. The electrically insulated conductor of claim 3 wherein at least one of the heat-sealable fluorinated resin layers is pigmented.

5. The electrically insulated conductor of claim 3 to which is applied an additional layer of cast polytetrafluoroethylene film, one surface of which is covered by a heat-sealable fluorinated resin layer, in such a manner that said heat-sealable layer contacts said insulated conductor and is sealed thereto, said heat-sealable fluorinated resin layer consisting of B-stage polytetrafluoroethylene.

6. The electrically insulated conductor of claim 5 wherein at least one of the heat-sealable fluorinated resin layers is pigmented.

7. An electrically insulated conductor for conducting electricity at high temperature without breakdown comprising, a metallic conductor covered by a layer of cast polytetrafluoroethylene film, one surface of which is covered by a heat-sealable fluorinated resin layer, in such a manner that said heat-sealable layer does not contact the conductor and is externally sealed to a heat- and oxidation-resistant, preshrunk polyimide film coated on both sides by a first layer of cast polytetrafluoroethylene and a second layer of heat-sealable fluorinated resin, each of said heat-sealable fluorinated resin layers consisting of a melt-processable resin selected from the group consisting of fluorinated ethylene propylene resin and polychlorotrifluoroethylene.

8. The electrically insulated conductor of claim 7 wherein at least one of the heat-sealable fluorinated resin layers is pigmented.

9. The electrically insulated conductor of claim 7 to which is applied an additional layer of cast polytetrafluoroethylene film, one surface of which is covered by a heat-sealable fluorinated resin, in such a manner that said heat-sealable layer contacts said insulated conductor and is sealed thereto, said heat-sealable fluorinated resin layer consisting of a melt-processable resin selected from the group consisting of fluorinated ethylene propylene resin and polychlorotrifluoroethylene.

10. The electrically insulated conductor of claim 9 wherein at least one of the heat-sealable fluorinated resin layers is pigmented.

11. An electrical insulated conductor for conducting electricity at high temperature comprising a plurality of separated parallel filaments of conductive metal in a flat plane covered and sealed on both sides between two heat- and oxidation-resistant, preshrunk polyimide film tapes, each of which tapes are coated on both sides by a first layer of cast polytetrafluoroethylene and a second layer heat-sealable B-stage polytetrafluoroethylene, said electrical insulated conductor having the form of a flat, flexible cable.

12. The electrical insulated conductor of claim 11 wherein at least one layer of the heat-sealable B-stage polytetrafluoroethylene is pigmented.

13. An electrical insulated conductor for conducting electricity at high temperatures comprising a plurality of separated parallel filaments of conductive metal in a flat plane covered and sealed on both sides between two heat- and oxidation-resistant, preshrunk polyimide tapes, each of which tapes are covered on both sides by a first layer of cast polytetrafluoroethylene and a second layer consisting of a melt-processable resin selected from the group consisting of fluorinated ethylene propylene resin and polychlorotrifluoroethylene wherein sufficient melt-processable resin is present to serve as a filler between said parallel filaments of conductive metal, said electrical insulated conductor having the form of a flat, flexible cable.

14. The electrical insulated conductor of claim 13 wherein at least one layer of the melt-processable resin is pigmented.

15. An electrical insulated conductor for conducting electricity at high temperatures wherein the conductor consists of a flat patterned metal foil circuit covered and sealed on both sides between two heat- and oxidation-resistant, preshrunk polyimide films, each of which films are covered on both sides by a first layer of cast polytetrafluoroethylene and a second layer of heat-sealable B-stage polytetrafluoroethylene.

16. An electrical insulated conductor for conducting electricity at high temperature wherein the conductor consists of a flat patterned metal foil circuit covered and sealed on both sides between two heat- and oxidation-resistant, preshrunk polyimide films, each of which films are covered on both sides by a first layer of cast polytetrafluoroethylene and a second layer consisting of a melt-processable resin selected from the group consisting of fluorinated ethylene propylene resin and polychlorotrifluoroethylene.

17. An electrically insulated conductor for conducting electricity at high temperatures without breakdown comprising, a metallic conductor covered by a layer of a heat- and oxidation-resistant, preshrunk polyimide film coated on both sides by a first layer of polytetrafluoroethylene and a second layer of heat-sealable fluorinated resin.

References Cited

UNITED STATES PATENTS 3,057,952 10/1962 Gordon _____ 161—189 X
3,168,417 2/1965 Smith _____ 174—120 X LEWIS H. MYERS, *Primary Examiner.*

E. GOLDBERG, *Assistant Examiner.*